United States Patent
Hebron et al.

(10) Patent No.: US 11,979,275 B2
(45) Date of Patent: May 7, 2024

(54) METHOD AND APPARATUS FOR ADMISSION TO A PREMISES-BASED CABLE NETWORK

(71) Applicant: Entropic Communications, LLC, New York, NY (US)

(72) Inventors: Yoav Hebron, San Diego, CA (US); Na Chen, San Diego, CA (US); Ronald Lee, San Diego, CA (US)

(73) Assignee: Entropic Communications, LLC

( * ) Notice: Subject to any disclaimer, the term of this patent is extended or adjusted under 35 U.S.C. 154(b) by 0 days.

(21) Appl. No.: 17/392,809

(22) Filed: Aug. 3, 2021

(65) Prior Publication Data

US 2022/0038336 A1  Feb. 3, 2022

Related U.S. Application Data

(63) Continuation of application No. 17/129,121, filed on Dec. 21, 2020, now abandoned, which is a continuation of application No. 16/876,787, filed on May 18, 2020, now abandoned, which is a continuation of application No. 16/128,064, filed on Sep. 11, 2018, now Pat. No. 10,659,296, which is a continuation of application No. 14/824,915, filed on Aug. 12, 2015, now Pat. No. 10,075,333.

(60) Provisional application No. 62/036,496, filed on Aug. 12, 2014.

(51) Int. Cl.
*H04L 41/08* (2022.01)
*H04L 41/0806* (2022.01)
*H04W 52/32* (2009.01)
*H04W 52/40* (2009.01)

(52) U.S. Cl.
CPC ......... *H04L 41/0806* (2013.01); *H04W 52/32* (2013.01); *H04W 52/322* (2013.01); *H04W 52/325* (2013.01); *H04W 52/40* (2013.01); *Y04S 40/00* (2013.01)

(58) Field of Classification Search
CPC .............. H04L 41/0806; H04W 52/32; H04W 52/322; H04W 52/325; H04W 52/40; Y04S 40/00
See application file for complete search history.

(56) References Cited

U.S. PATENT DOCUMENTS

| | | | |
|---|---|---|---|
| 8,069,483 B1 * | 11/2011 | Matlock | H04W 12/122 726/13 |
| 10,075,333 B2 | 9/2018 | Hebron et al. | |
| 2006/0111103 A1 | 5/2006 | Jeong et al. | |
| 2006/0171388 A1 * | 8/2006 | Ikeda | H04W 8/005 370/389 |
| 2009/0046682 A1 * | 2/2009 | Kim | H04W 28/06 370/338 |
| 2010/0008338 A1 | 1/2010 | Tsfati et al. | |
| 2010/0185759 A1 | 7/2010 | Wu | |
| 2010/0229015 A1 | 9/2010 | Hebron et al. | |

(Continued)

*Primary Examiner* — Steven Hieu D Nguyen
(74) *Attorney, Agent, or Firm* — Arch & Lake LLP

(57) ABSTRACT

Systems and methods for admitting new nodes into an existing network, for example a MoCA network. As a non-limiting example, various aspects of the present disclosure provide systems and methods for adding a new node to an existing network without requiring on-site manual configuration, for example utilizing communication between the new node and a network coordinator of the existing network prior to admission of the new node to the existing network.

20 Claims, 6 Drawing Sheets

(56) References Cited

U.S. PATENT DOCUMENTS

| | | |
|---|---|---|
| 2011/0080850 A1 | 4/2011 | Klein et al. |
| 2011/0173435 A1* | 7/2011 | Liu ....................... H04L 9/3226 |
| | | 713/150 |
| 2013/0259034 A1 | 10/2013 | Klein et al. |
| 2014/0140331 A1 | 5/2014 | Lee |

* cited by examiner

METHOD AND APPARATUS FOR ADMISSION TO A PREMISES-BASED CABLE NETWORK

CROSS-REFERENCE TO RELATED APPLICATIONS/INCORPORATION BY REFERENCE

This patent application is a continuation of U.S. patent application Ser. No. 17/129,121, filed on Dec. 21, 2020, and titled "Method and Apparatus for Admission to a Premises-Based Cable Network"; which is a continuation of U.S. patent application Ser. No. 16/876,787, filed May 18, 2020, and titled "Method and Apparatus for Admission to a Premises-Based Cable Network," now abandoned; which is a continuation of U.S. patent application Ser. No. 16/128,064, filed on Sep. 11, 2018, and titled "Method and Apparatus for Admission to a Premises-based Cable Network," now U.S. Pat. No. 10,659,296; which is a continuation of U.S. patent application Ser. No. 14/824,915, filed on Aug. 12, 2015, and titled "Method and Apparatus for Admission to a MoCA Network," now U.S. Pat. No. 10,075,333; which makes reference to, claims priority to and claims benefit from the United States Provisional Patent Application Serial No. 62/036,496, filed on Aug. 12, 2014, and titled "Method and Apparatus for Admission to a MoCA Network," each of which is hereby incorporated herein by reference in its entirety.

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND

Various communication networks, such as for example MoCA networks, lack a method and/or apparatus for efficiently adding a new node to the network, for example without requiring on-site manual configuration. Limitations and disadvantages of conventional methods and systems for handling the addition of a new node to a network, for example a MoCA network, will become apparent to one of skill in the art, through comparison of such approaches with some aspects of the present methods and systems set forth in the remainder of this disclosure with reference to the drawings.

SUMMARY

Figure 1:
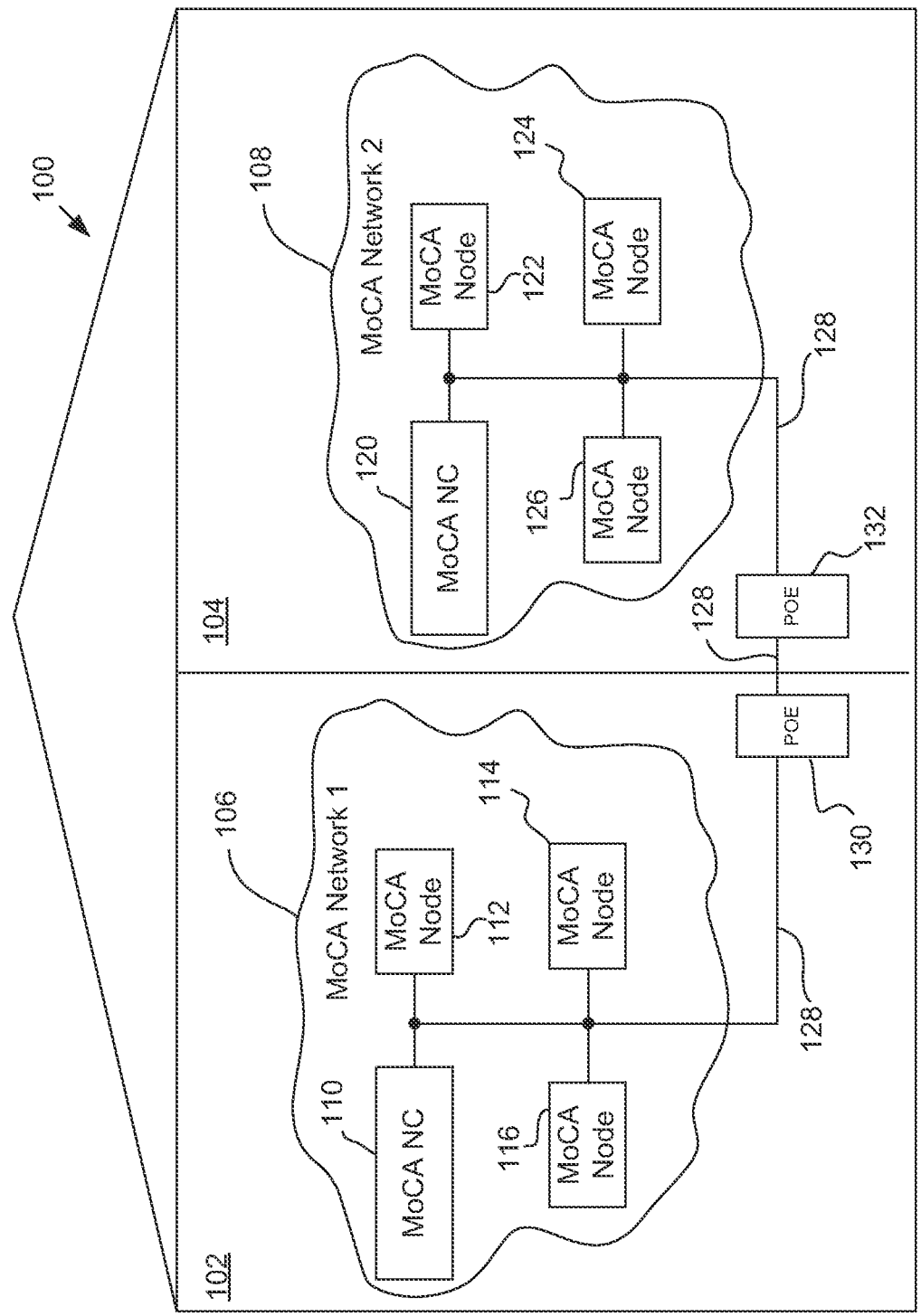
FIG. 1 is a simplified illustration of a multiple dwelling unit (MDU) in which at least two homes each have a respective MoCA network.

Various aspects of this disclosure provide systems and methods for admitting new nodes into an existing network, for example a MoCA network. As a non-limiting example, various aspects of the present disclosure provide systems and methods for adding a new node to an existing network without requiring on-site manual configuration, for example utilizing communication between the new node and a network coordinator of the existing network prior to admission of the new node to the existing network.

DETAILED DESCRIPTION OF VARIOUS ASPECTS OF THE DISCLOSURE

As utilized herein the terms "circuits" and "circuitry" refer to physical electronic components (i.e., hardware) and any software and/or firmware ("code") that may configure the hardware, be executed by the hardware, and or otherwise be associated with the hardware. As used herein, for example, a particular processor and memory (e.g., a volatile or non-volatile memory device, a general computer-readable medium, etc.) may comprise a first "circuit" when executing a first one or more lines of code and may comprise a second "circuit" when executing a second one or more lines of code.

As utilized herein, circuitry is "operable" to perform a function whenever the circuitry comprises the necessary hardware and code (if any is necessary) to perform the function, regardless of whether performance of the function is disabled, or not enabled (e.g., by a user-configurable setting, factory setting or trim, etc.).

As utilized herein, "and/or" means any one or more of the items in the list joined by "and/or". As an example, "x and/or y" means any element of the three-element set {(x), (y), (x, y)}. That is, "x and/or y" means "one or both of x and y." As another example, "x, y, and/or z" means any element of the seven-element set {(x), (y), (z), (x, y), (x, z), (y, z), (x, y, z)}. That is, "x, y, and/or x" means "one or more of x, y, and z." As utilized herein, the terms "e.g.," and "for example" set off lists of one or more non-limiting examples, instances, or illustrations.

The terminology used herein is for the purpose of describing particular examples only and is not intended to be limiting of the disclosure. As used herein, the singular forms are intended to include the plural forms as well, unless the context clearly indicates otherwise. It will be further understood that the terms "comprises," "includes," "comprising," "including," "has," "have," "having," and the like when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of the present disclosure. Similarly, various spatial terms, such as "upper," "lower," "side," and the like, may be used in distinguishing one element from another element in a relative manner. It should be understood, however, that components may be oriented in different manners, for example a semiconductor device may be turned sideways so that its "top" surface is facing horizontally and its "side" surface is facing vertically, without departing from the teachings of the present disclosure.

A premises (e.g., a home, office, campus, etc.) may comprise a communication network for the sharing of information between various devices within the premises. For example, entertainment content may be received through a wide area network (WAN) provided by an MSO (Multi-system Operator), such as a cable television operator or satellite content provider. Content provided to the premises may be distributed throughout the premises over a premises-based network (e.g., a home entertainment network, general premises-based communication network, etc.). The premises-based network may, for example, comprise a local area network (LAN) in any of a variety of configurations, such as a mesh network. An example protocol for establishing a premises-based network, for example a home entertainment LAN, is defined by the well-known MoCA (Multi-media over Coax Alliance) network protocol that is in-use today.

FIG. 1 is a simplified illustration of a multiple dwelling unit (MDU) in which at least two homes (or dwelling units) each have a respective MoCA network. The example multiple dwelling unit (MDU) 100 (e.g., an apartment building, condominium complex, office building, etc.), comprises at least two homes 102, 104, each having a respective MoCA network 106, 108. In the example shown in FIG. 1, the first MoCA network 106 has four nodes 110, 112, 114, 116, and the second MoCA network 108 has four nodes 120, 122, 124, 126. The nodes of each network 106, 108 are coupled to a coaxial medium 128. The coaxial medium within the MDU 100 is such that signals present on the coaxial cables installed in the MDU 100 are coupled to all eight of the nodes 110, 112, 114, 116, 120, 122, 124, 126 of the two networks 106, 108. In general, it is undesirable for the nodes 110, 112, 114, 116 operated by the occupant of the first home 102 to be able to join the network of the other home 104 and access nodes 120, 122, 124, 126 that are operated by the occupant of the other home 104. To maintain isolation between the two networks 106, 108, one or more point-of-entry (POE) devices 130, 132 may be installed between the two networks 106, 108. In the example shown in FIG. 1, the first network 106 comprises a first POE device 130, and the second network 108 comprises a second POE device 132.

A POE device may, for example, comprise filters that prevent signals generated at a first frequency used by the first network 106 from passing through the POE device 130 to the nodes 120, 122, 124, 126 of the second network 108 operating at a second frequency or the same frequency. Having each network 106, 108 operate in a different frequency band makes it easier for the filter in the POE device 130, 132 to ensure that the two networks 106, 108 can be isolated from one another. It will be understood that multiple networks that the user wishes to keep isolated can exist within the same home as well.

Typically, installing POE devices, such as the example POE devices 130, 132 of FIG. 1, requires a professional installer, typically employed by a service provider that provides content to the home owner, such as a cable television company or satellite service provider. For example, the coaxial cables may be disconnected at a point of entry to each home and connectors installed to allow the coaxial cable to be connected to the input of the POE device 130, 132 on one end of the cut coaxial cable and to the output of the POE device 130, 132 on the other end of the cut coaxial cable. Such installation may, for example, be difficult if not impossible for a resident of the home in which the network is being used, and may in fact be prohibited. For example, the equipment might not be accessible to the resident and/or specialized knowledge may be required to properly install POE equipment. This, for example, may create a need for a professional installer to make a house call.

Accordingly, various aspects of the present disclosure provide methods and apparatus that can keep networks isolated from one another when they share a common medium and which provide for a new node to be installed and admitted to a particular desired network without the need for a POE device and/or without the possibility of the node gaining admission to a network to which either the owner of the node, or the owner of the network, would object.

Various aspects of the present disclosure provide methods and apparatus that allow a new node to discriminate between networks when determining whether to attempt to gain admission to a network. In accordance with various aspects of the present disclosure, a network name may be attained by a new node from a network coordinator (NC) (or network controller) of a MoCA (Multimedia over Coax Alliance) network, prior to the new node gaining admission. In accordance with an example implementation, a new node listens for a Beacon message (also referred to herein as a Beacon). The Beacon may, for example, be broadcast by an NC of an existing network. Upon receiving the Beacon, the new node determines from information contained within the Beacon when to send a Discovery Request message. The new node then sends a Discovery Request message that includes a DISCOVERY_OPTIONS field having a value that indicates that the NC is to send MoCA Network attributes. One of the attributes that the NC will return is a name assigned to the network to which the NC belongs, assuming that the NC belongs to a network for which a name has been assigned. The new node will then listen for another Beacon that will indicate when a Discovery Response message will be transmitted by the NC. The new node will receive the Beacon, determine when the Discovery Response message will be sent, and receive the Discovery Response message that includes a Network Name Network IE (information element). The Discovery Request and Discovery Response message may, for example, be sent on the frequency on which the Beacon message was received. The new node will determine the name of the network from the contents of a NETWORK_NAME field in the Network Name Network IE. The new node will then determine whether the name of the network identifies a network to which the new node is authorized to join. The new node will continue with an admission process in accordance with the MoCA protocol only if authorized to join the identified network.

This disclosure presents many aspects in the context of a MoCA network. It should be understood that the various aspects presented herein also apply to other types of networks, for example governed by different protocols.

Figure 2:
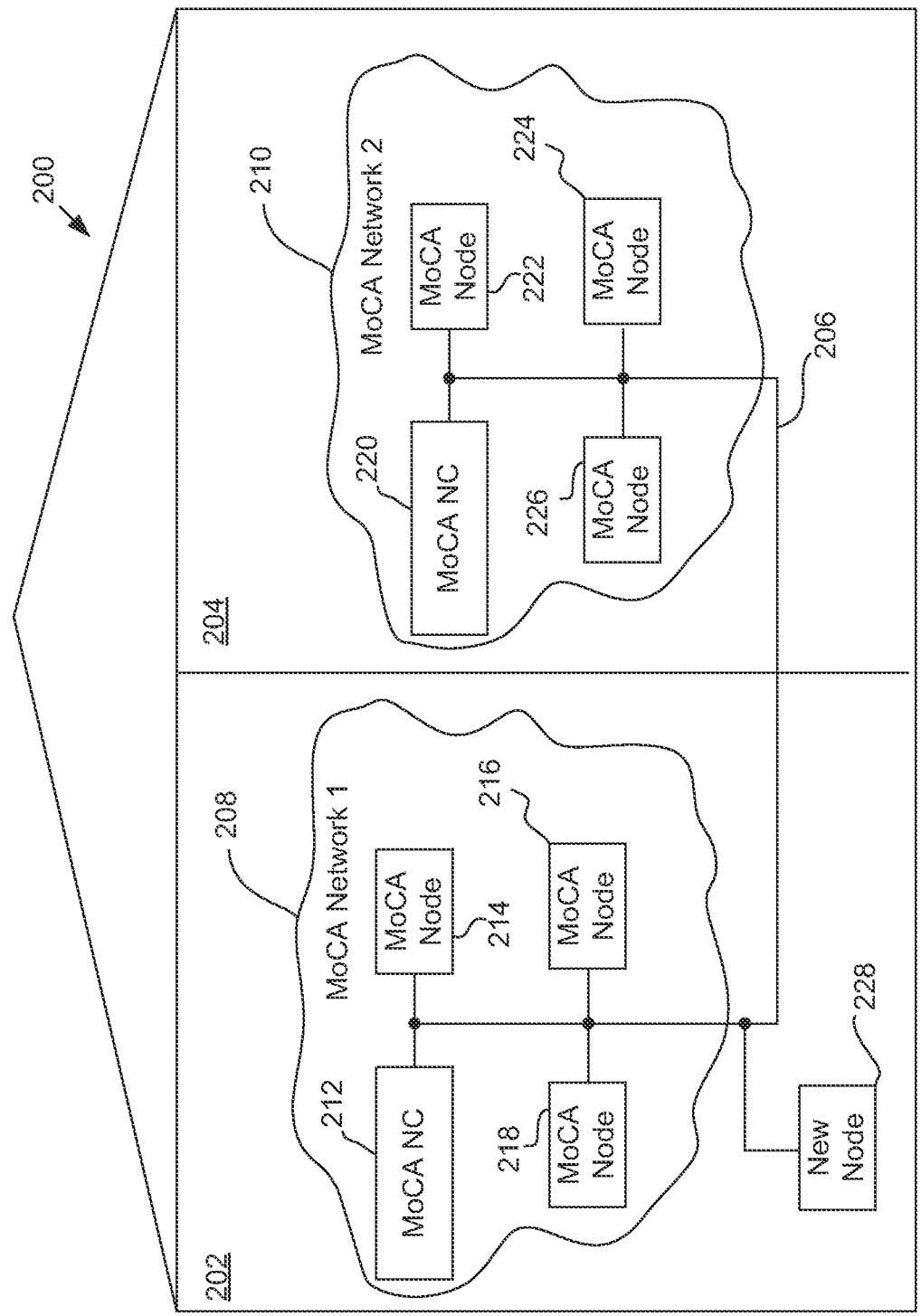
FIG. 2 is a simplified illustration of a Multiple Dwelling Unit (MDU) in which two homes share a common coaxial cable used by two independent MoCA networks, in accordance with various aspects of the present disclosure.

FIG. 2 is a simplified illustration of a Multiple Dwelling Unit (MDU) in which two homes share a common coaxial cable used by two independent MoCA networks, in accordance with various aspects of the present disclosure. The example multiple dwelling unit (MDU) 200 comprises two homes 202, 204 that share a common coaxial cable 206 used as a medium for communicating between nodes 212, 214, 216, 218 of a first independent MoCA network 208 and nodes 220, 222, 224, 226 of a second independent MoCA network 210. In each example MoCA network 208, 210, a respective one of the four MoCA nodes 212, 220 operates as the network coordinator (NC). Each node may, for example, be capable of operating as the NC. However, only one NC is shown for each network. In addition to the respective four nodes in each network, a new node 228 is shown. The new node 228, in the various example scenarios discussed herein, has not yet been admitted to either of the networks 208, 210.

In an example scenario, the new node 228 may have been provided to a resident of the home 202 into which it is to be installed by the resident. The resident connects the node 228 to the coaxial cable 206. Alternatively, the new node 228 can be installed by a professional installer. It should be understood that while MDUs are utilized to illustrate various aspects of the present disclosure, the scope of this disclosure is not limited thereto. For example, the various aspects of this disclosure also apply readily to adjacent stand-alone structures (e.g., single-family homes).

Figure 3:
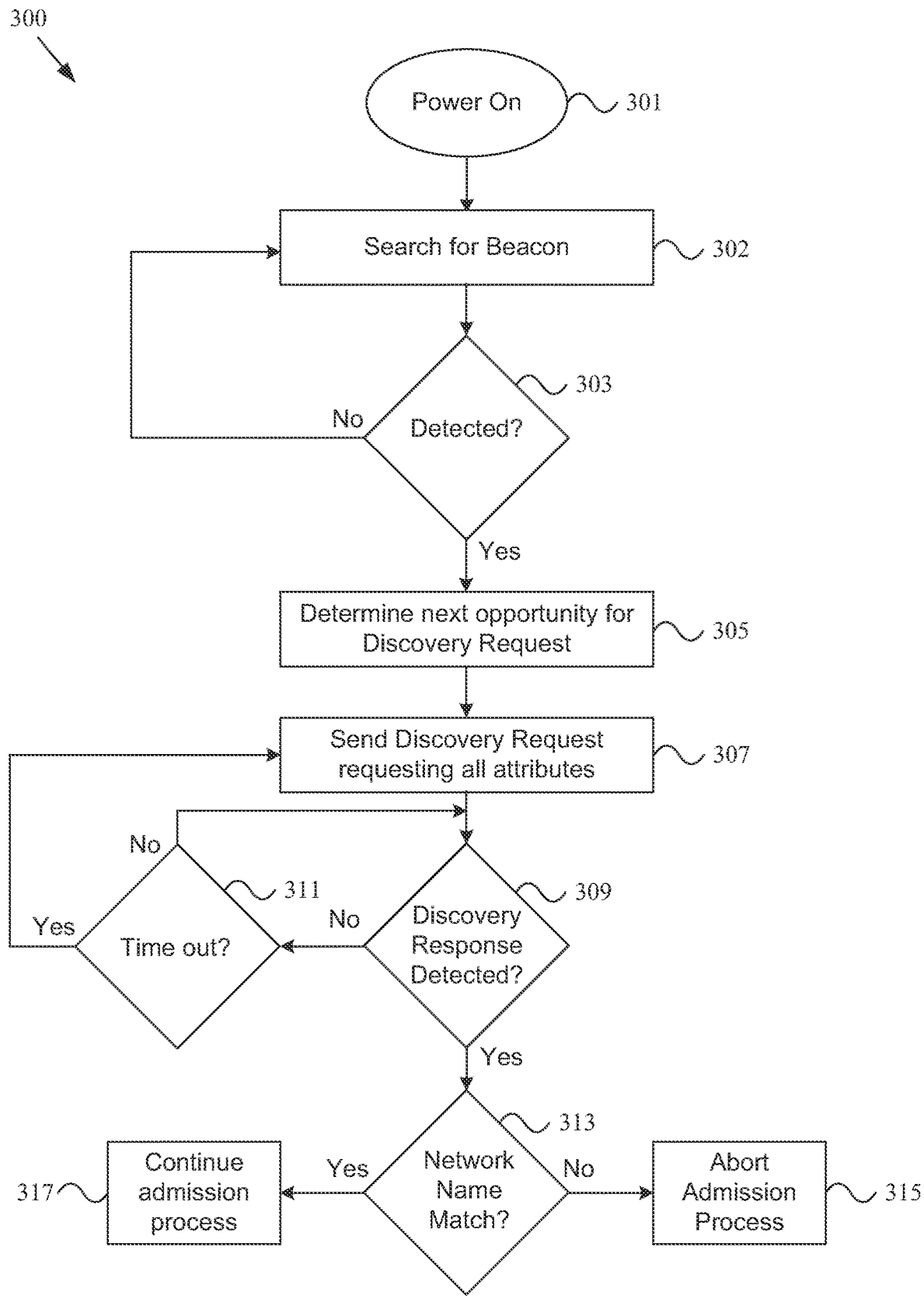
FIG. 3 is a flow diagram of an example method for joining a network, in accordance with various aspects of the present disclosure.

FIG. 3 is a flow diagram of an example method 300 for joining a network, in accordance with various aspects of the present disclosure. The example method 300 may, for example, be performed by any or all network nodes presented herein. For example, the example method 300 may be followed by a new node looking to gain admission to (or attach to) a communication network. The discussion herein will proceed referring to the operation of new node 228, shown in FIG. 2. It should be understood, however, that the scope of the various aspects of the present disclosure is not limited to operation of a new node.

The example method 300 begins executing at block 301 in response to a power-on condition of the new node 228. It should be understood, however, that the example method 300 may begin executing in response to any of a variety of causes or conditions. For example, the example method 300 may begin executing in response to a hard reset of the new node 228, in response to a user request or command received at the new node 228, in response to a request or command from another node (e.g., a network coordinator node or other node), in response to execution of a related flow diagram, etc.

At block 302, the new node 228 searches for a Beacon message. For example, the new node 228 may search the signals that are being transmitted over the coaxial cable 206 to identify a Beacon message (or Beacon). As explained herein, the coaxial cable might comprise only signals associated with a single network, but may also comprise signals associated with a plurality of networks (e.g., a plurality of home-based cable networks).

At flow control block 303, if a Beacon is not detected, then execution flow of the example method 300 may return to block 302 for continued searching. If, however, a Beacon is detected, then execution flow of the example method 300 may proceed to block 305. Beacons may, for example, be generated by one or more network coordinators.

At block 305, for example after the new node 228 detects a Beacon, the new node 228 may determine from information carried by the Beacon when the next Admission Control Frame (ACF) slot will occur and/or when the next ACF slot that is designated for communication of a Discovery Request message will occur. The ACF slot may, for example, be designated for the communication of any of a variety of types of admission control messages. For example, the ACF slot may be designated specifically for transmission of a Discovery Request message (e.g., as indicated by type and/or sub-type information contained in the Beacon). For example, if there is a network that is currently operating on the medium to which the new node 228 is connected, the NC of that network may send out periodic Beacons. These Beacons may, for example, indicate times when a new node can send messages related to admission to the network. Such requests may, for example, include requests for the NC to provide information regarding the network.

At block 307, the new node 228 may (e.g., at the next opportunity to send a Discovery Request message), transmit a Discovery Request message. In accordance with various aspects of this disclosure, the Discovery Request message may for example carry a Discovery Request Network IE (Information Element).

Figure 4:
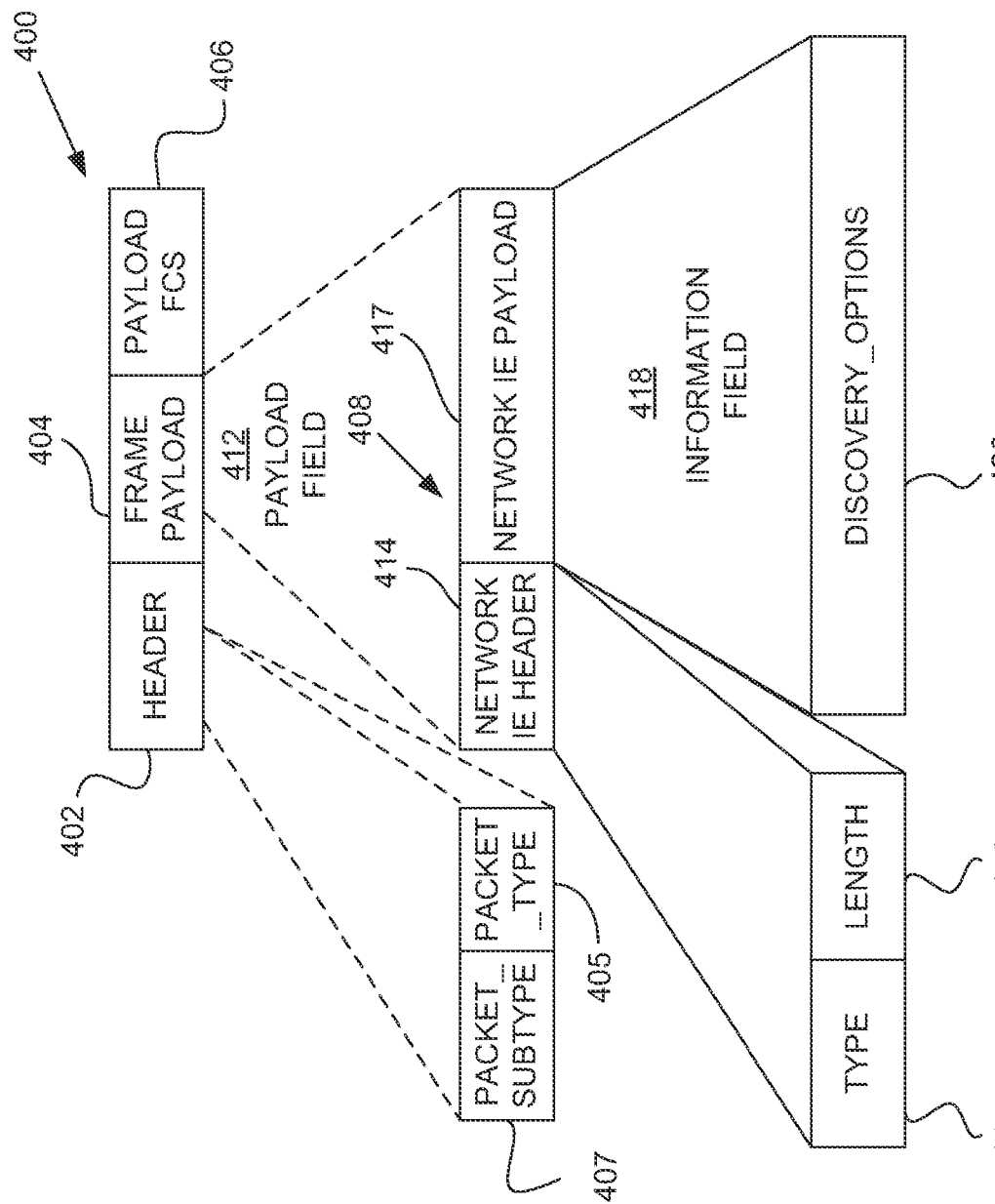
FIG. 4 is an illustration of a format of an example Discovery Request message, in accordance with various aspects of the present disclosure.

FIG. 4 is an illustration of a format of an example Discovery Request message, in accordance with various aspects of the present disclosure. The example Discovery Request message 400 comprises a header 402, frame payload 404 and payload FCS (Frame Check Sequence) 406. The header 402 may, for example, comprise several fields, non-limiting examples of which are provided herein. One of the fields may, for example, comprise a PACKET_TYPE field 405. The PACKET_TYPE field 405 may, for example, be set to a value to indicate that the communication is a Link Control II message. Another of the fields in the header 402 may, for example, comprise a PACKET_SUBTYPE field 407. The value of the PACKET_SUBTYPE field 407 may, for example, be set to a value to indicate that the Discovery Request message 400 is a Pre-Admission Discover Request. The frame payload 404 may, for example, comprise a PAYLOAD field 412. The PAYLOAD field 412 may, for example, be loaded with a Discovery Request Network IE 408. The Discovery Request Network IE 408, in turn, may comprise a Network IE Header 414 and a Network IE Payload 417. The Network IE Header 414 may, for example, comprise a TYPE field 415 and a LENGTH field 416. The TYPE field 415 may, for example, be set to a value to indicate that the payload 404 is a Discovery Request Network IE. The LENGTH field 416 may, for example, indicate the length of the Discovery Request Network IE 408.

In accordance with one example implementation, the Network IE Payload 417 might have only one field, which may be referred to as an INFORMATION field 418. When the Network IE being sent is a Discovery Request Network IE, the INFORMATION field 418 may, for example, be used as a DISCOVERY_OPTIONS field 420. In one example implementation, the DISCOVERY_OPTIONS field 420 may be set to a value to indicate that the NC is to provide all of the network attributes that are available (or for example a specified and/or predefined set of network attributes).

Referring back to the example method 300, in accordance with an example implementation, after sending the Discovery Request message, for example including a request for the NC to send all attributes, at block 309, the new node 228 may listen for a Beacon that indicates when the NC will send a responsive Discovery Response message. For example, operation of the new node 228 may loop between flow control blocks 309 and 311 until either detecting a Discovery Response message having a Network Name Network IE, at which point flow control block 309 will direct execution flow to block 313, or timing out, at which point flow control block 311 will direct execution flow back up to block 307.

At block 313, upon detecting a Discovery Response message having a Network Name Network IE, the new node 228 determines whether the name provided by the network matches the name of the network that the new node 228 is authorized to join, or for example otherwise indicates that the new node 228 is authorized to join the network.

Table 1 shows an example format of the Network Name Network IE.

TABLE 1

| Field | Length | Value |
|---|---|---|
| Network IE Header | | |
| TYPE | 8 bits | 0x01 |
| LENGTH | 8 bits | ≤8 Actual length, including the IE Header, in bytes = (LENGTH + 1) * 4 |
| Network Name Network IE Payload | | |
| RESERVED | 16 BITS | Reserved for Future Use |
| NETWORK_NAME | VARIABLE | ASCII encoded string (up to 32 octets) representing the name of the network. |
| PADDING | VARIABLE | To make the total length of the IE a multiple of 4 bytes. All padding bytes MUST be set to value 0x00. |

As seen from Table 1, the example Network Name Network IE comprises a Network IE Header that comprises two fields. The first field is a TYPE field that carries the value 0x01, wherein the prefix "0x" indicates that the value that follows (e.g., "01") is a hexadecimal value. The second field is a LENGTH field that indicates the length of the Network Name Network IE, including the IE Header. The example Network Name Network IE also comprises an IE Payload. The example IE Payload comprises three fields. The first field is reserved for future use. The second field carries the name of the network to which the sender of the Network Name Network IE belongs. The third field is used to pad the Network Name Network IE to ensure that the length is a multiple of 4 bytes.

In accordance an example implementation, when the new node 228 receives the Discovery Response message comprising a Network Name Network IE, at block 313, the new node 228 compares the value of the NETWORK_NAME field with a value of a control parameter NETWORK_NAME$_{ADMIT}$. In accordance with an example implementation, the value of the control parameter NETWORK_NAME$_{ADMIT}$ is set by a management entity (discussed elsewhere herein) of the new node 228. In one example implementation, the management entity sets the value in response to a command provided to the new node 228 prior to being provided to a resident of the home in which the new node 228 is to be installed. Alternatively for example, the control parameter can be set in response to a command given to the new node 228 in the field by a field technician and/or user. In any case, unless the control parameter NETWORK_NAME$_{ADMIT}$ is equal to the name received in the NETWORK_NAME field of the Network Name Network IE, or otherwise, unless the value of control parameter NETWORK_NAME$_{ADMIT}$ is "ALL", flow control block 313 will direct execution flow of the example method 300 to block 315, at which the new node 228 will abort the admission process for the network associated with the NC that sent the Discovery Response message. If, however, the NETWORK_NAME field either matches the value of the control parameter NETWORK_NAME$_{ADMIT}$ or is equal to "ALL", the flow control block 313 will direct execution flow of the example method 300 to block 317, at which the new node 228 will continue with the admission process.

In accordance with various aspects of the disclosure, at least the following four control parameters indicated in Table 2 may be maintained, for example in addition to any others already specified (e.g., by the MoCA standard, by other standards, etc.):

TABLE 2

| Parameters Name | R/W/E* | Description | Values | Controlled by Management Entity | Configurable by End User |
|---|---|---|---|---|---|
| NETWORK_NAME$_{CREATE}$ | W | The Network Name the Node is to use for any MoCA network it creates, or indicating no name to use for the network. | NULL or up to 32 ASCII characters (except 'ALL' and 'NULL') representing the name of the network | Y | Y |
| NETWORK_NAME$_{REC}$ | E | Reports that the Node has received a Network Name which is available through the parameter NETWORK_NAME$_{PAYLOAD}$. | N/A | Y | N |
| NETWORK_NAME$_{PAYLOAD}$ | R | The payload of the latest received Network Name from the NC. | The Network Name in the latest received Discovery Response message. | Y | Y |
| NETWORK_NAME$_{ADMIT}$ | W | Indicates to the Node which specific network to join or to join any network. | NONE, ALL or up to 32 ASCII characters (except 'NONE' and 'ALL') representing the name of the network | Y | Y |

The first column of TABLE 2 indicates the name of the control parameter. The second column is marked with an "R" if the parameter is readable by an external management entity or by the end user. The second column is marked with a "W" if the parameter is writable by an external management entity or the end user. Alternatively, the second column is marked with an "E" if the parameter is an Event indicated by the new node 228. For example, when the new node 228 receives a value in the parameter NETWORK_NAME$_{PAYLOAD}$, the control parameter NETWORK_NAME$_{REC}$ is reported in response.

The third column provides a description of the control parameter. The fourth column indicates what values are permissible in accordance with one example implementation of the disclosed method and apparatus for the control parameter. It should be understood that other values could be used as well. The fifth column indicates whether the management entity controls the parameter. The sixth column indicates whether the user can configure the control parameter. It should also be understood that the parameter names were selected for illustrative clarity, and that any of a variety of alternative names may be utilized.

The first example control parameter in Table 2 is NETWORK_NAME$_{CREATE}$. This control parameter holds a value that indicates the name to be used if the associated node (e.g., the new node 228, the network coordinator node 212, etc.) creates a new network. The value can be set to a particular name. In one example implementation, the values "ALL" and "NULL" are not permitted to be used as network names, since they are reserved values with a particular meaning. NETWORK_NAME$_{CREATE}$ is controlled by the management entity, but is also user configurable.

The second example control parameter in Table 2 is NETWORK_NAME$_{REC}$. This parameter is an event driven parameter used to report that the node (e.g., the new node 228, etc.) has received a network name through the parameter NETWORK_NAME$_{PAYLOAD}$. In accordance with one example implementation, this parameter is controlled by the management entity and cannot be configured by the user. Also, in one example implementation, this event is not reported to the user.

The third example control parameter in Table 2 is NETWORK_NAME$_{PAYLOAD}$. This parameter carries the value that was in the PAYLOAD field of last received Network Name Network IE. The parameter is reported from the node to the management entity of the node and/or user, but is also user configurable.

The fourth control parameter in Table 2 is NETWORK_NAME$_{ADMIT}$. This parameter indicates which network(s) the node (e.g., the new node 228, etc.) is authorized to join. This parameter is controlled by the management entity and is also user configurable.

By ensuring a new node can only join a network if the control parameter NETWORK_NAME$_{ADMIT}$ matches the name of the network to which the new node is considering joining, or that the value of the control parameter NETWORK_NAME$_{ADMIT}$ is equal to "ALL", the management entity (or technician, etc.) of the node can control which network a node will join. It can be seen from this that if a new node is installed in a network situation such as that shown in FIG. 2, it will not be necessary to have a POE filter to block Beacons from the MoCA network 210. For example, the new node 228 will not be permitted to join that network 210 since the network name associated with the MoCA network 210 will not match the value of the control parameter that was provided to the new node (e.g., by the management entity, by a technician, etc.).

In accordance with various aspects of the present disclosure, methods and apparatus are thus provided by which a new node can determine the name of a network prior to gaining admission to the network and without having to have a technician (e.g., an on-site technician) enter the name of the network. Accordingly, a new node can be installed with sufficient ease as to make it possible for an unsophisticated customer of a service provider to install a new node without the aid of a trained technician.

Figure 5:
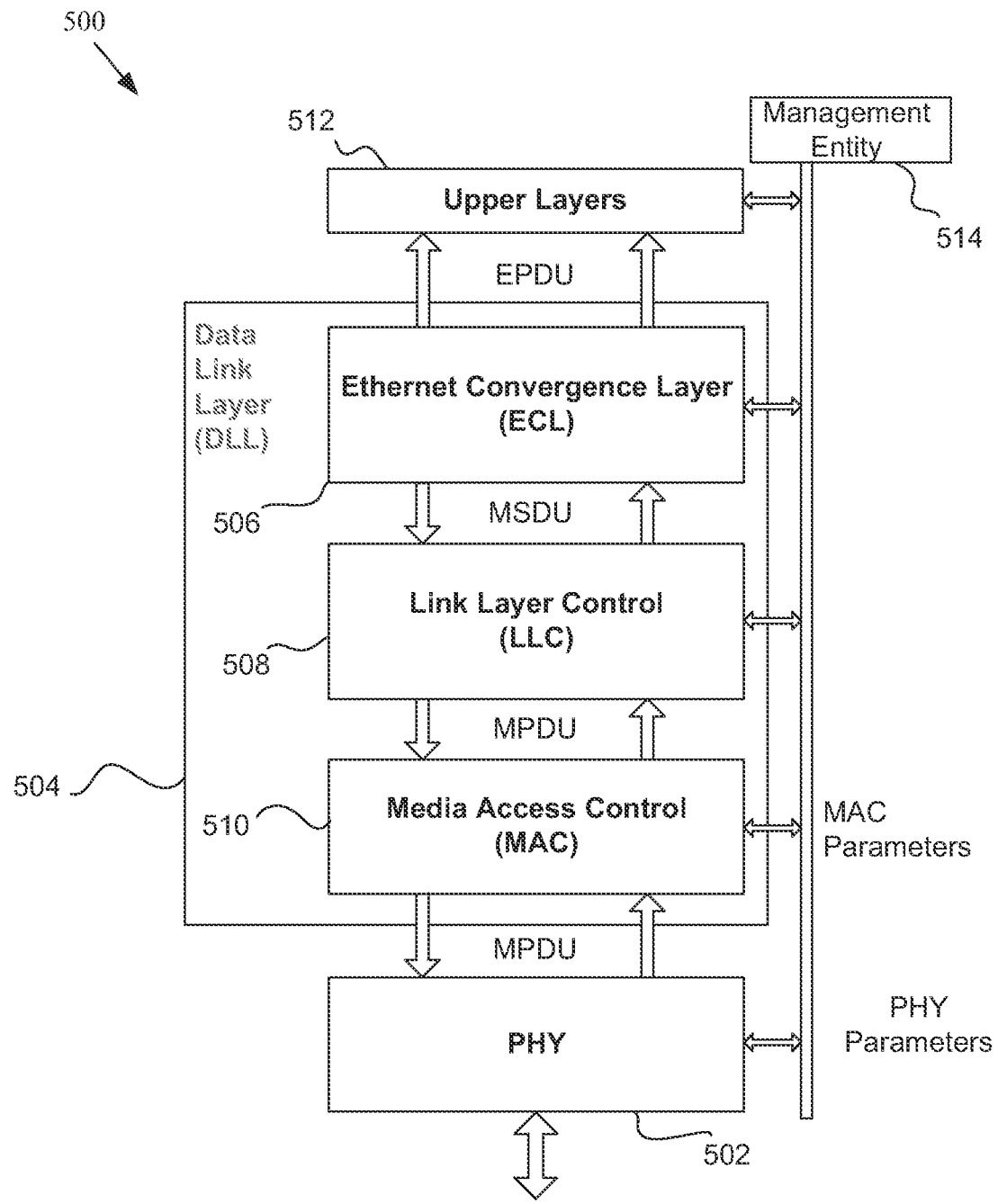
FIG. 5 is a logical block diagram of a network node, in accordance with various aspects of the present disclosure.

FIG. 5 is a logical block diagram of a network node 500, in accordance with various aspects of the present disclosure. The network node 500 may, for example, be operable to perform any or all of the node functionality discussed herein (e.g., for a new node 228, network coordinator node 212, existing node 214, 218, any or all of the nodes discussed herein, etc.). The example node 500 uses the seven layer Open System Interconnection (OSI) model and/or any generally analogous layered communication model. For example, the node 500 may comprise circuitry that operates to implement a physical layer 502 which is responsible for controlling the physical interface to the medium (e.g., cable medium, phone line medium, other wired medium, wireless medium, tethered and/or untethered optical medium, etc.), including transmitting signals over the medium.

The node 500 may comprise circuitry that operates to implement a Data Link Layer (DLL) 504, for example comprising several sub-layers (e.g., an Ethernet Convergence Layer (ECL) 506, Link Layer Control (LLC) 508, Media Access Control (MAC) 510, etc. The DLL 504 may, for example, be responsible for controlling the high layer operation of the physical layer and determining the timing and management of messages to be transmitted and received. Accordingly, the DLL 504 may work with the physical layer 502 to perform any or all of the functions noted in FIG. 3 and/or discussed elsewhere herein. In one example implementation, the DLL 504 is implemented by the execution of software running on at least one processor. The DLL 504 and/or any of the layers shown in FIG. 5 may be implemented by any of a variety of types of processing circuitry (e.g., application-specific integrated circuitry, programmable array logic circuitry, discrete logic circuitry, general-purpose processor circuitry, specific-purpose processing circuitry, etc.).

Figure 6:
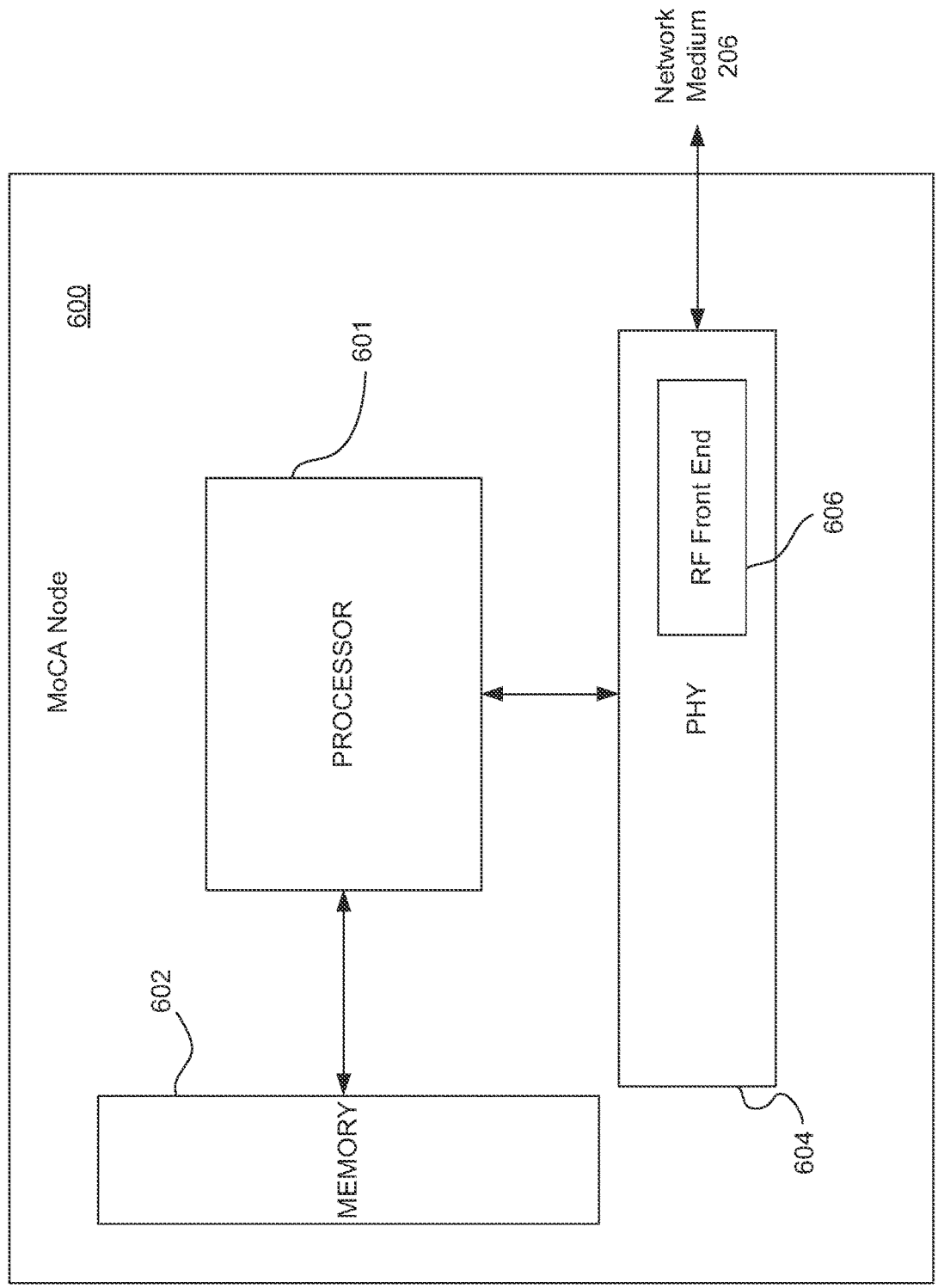
FIG. 6 is a simplified block diagram of an example network node, in accordance with various aspects of the present disclosure.

FIG. 6 is a simplified block diagram of an example network node 600, in accordance with various aspects of the present disclosure. The network node 600 may, for example, be operable to perform any or all of the node functionality discussed herein (e.g., with regard to FIGS. 1-5). The network node 600 may, for example, share any or all characteristics with any of the nodes discussed herein (e.g., the node 500 of FIG. 5, the nodes 212, 214, 216, 218, 220, 222, 224, 226, 228 of FIG. 2, the nodes 110, 112, 114, 116, 120, 122, 124, 126 of FIG. 1, etc.).

The node 600 comprises at least one processor 601, a memory 602, and a PHY 604. The memory 602 is coupled to the processor 601. The PHY 604 includes an RF front end 606. The PHY may also include a dedicated processor (not shown) that performs functions associated with the PHY 604. Alternatively, some control functions of the PHY 604 may be performed by the processor 601. In the transmit path, the PHY 604 and/or RF Front End 606 may receive information from the processor 601. The information is modulated on signals generated by the RF front end 606. The RF front end 606 transmits such signals over a medium 206 (e.g., over coaxial cabling used to connect notes of a MoCA network, etc.). In the receive path, the PHY 604 and/or RF front end 606 receives signals from the medium 206, demodulates the signals to retrieve the information communicated by such signals, and passes the received information to the processor 601 for processing. It should be understood that, while the example node 600 shown in FIG. 6 (and other nodes discussed herein) is described with respect to a node connected to a network via coaxial cable, the node 600 may be connected to the network over any medium.

The processor 601 within the node 600 performs several tasks. The example node 600 is shown and described as having a single processor 601 that performs all of the disclosed tasks and functions of the node 600. Nonetheless, it should be understood that the disclosed tasks and functions of the node 600 may be performed by any combination of hardware, firmware, and software. Furthermore, any software or firmware may be executed by one or a combination of several independent or coordinated processors. For example, in various example implementations, it may be more efficient to use processors dedicated to performing a particular task or group of tasks. Also for example, the processor 601 (or processors) may comprise any of a variety of processing circuits (e.g., general purpose processors, specific purposes processors, microcontrollers, application-specific integrated circuits, programmable state machine devices, analog and/or digital circuitry, etc.). In an alternative embodiment, the node 600 may have several processors that work together or independently. The processor 601 may, for example, read computer readable program code from the memory 602 and execute the code to perform the functions of the DLL 504, the upper layers 512 and/or the management entity 514 (see FIG. 5). In one example implementation, the management entity 514 is not co-located with the DLL 504. In such an example implementation, the management entity 514 may be implemented using a different processor or processors. Likewise, in one example implementation, the upper layers 512 are not co-located with the DLL 504. It should be understood that the particular physical layout of the logical components may vary substantially, so long as the disclosed functionality may be performed. In an alternative implementation, the functions of the DLL 504 and other functions disclosed herein may be performed by dedicated hardware, firmware or a combination of hardware, firmware and software executed by a special or general purpose processor.

In summary, various aspects of this disclosure provide systems and methods for admitting new nodes into an existing network, for example a MoCA network. While the foregoing has been described with reference to certain aspects and examples, it will be understood by those skilled in the art that various changes may be made and equivalents may be substituted without departing from the scope of the disclosure. In addition, many modifications may be made to adapt a particular situation or material to the teachings of the disclosure without departing from its scope. Therefore, it is intended that the disclosure not be limited to the particular example(s) disclosed, but that the disclosure will include all examples falling within the scope of the appended claims.

The invention claimed is:

1. A network node, the node comprising:
   at least one circuit in a MoCA (Multi-media over Coax Alliance) network comprising:
      a network communication circuit; and
      a processor and memory,
   wherein the at least one circuit is operable to, at least:
      send a first broadcast message comprising timing information that indicates when an admission control message is allowed to be transmitted;
      receive the admission control message; and
      in response to the admission control message:
         form an admission control response message by, at least in part, operating to:
            determine, based at least in part on contents of the admission control message, whether to include a network name in the admission control response message; and
            if it is determined to include a network name in the admission control response message, then include the network name in the admission control response message;
         send a second broadcast message comprising second timing information that indicates when the admission control response message will be sent;
         maintain a NETWORK NAME$_{REC}$ parameter to report that a particular node name was received;
         maintain the particular node name as a NETWORK_NAME$_{PAYLOAD}$ parameter; and
         send the admission control response message comprising a network admission control parameter, wherein at least one value of the network admission control parameter indicates that the network node may join only a network having a particular name, and wherein the at least one value of the network admission control parameter is the particular name.

2. The network node of claim 1, wherein the first broadcast message is a first Beacon message, and the second broadcast message is a second Beacon message.

3. The network node of claim 2, wherein the admission control message is a Discovery Request message, and the admission control response message is a Discovery Response message.

4. The network node of claim 1, wherein the at least one circuit is operable to determine whether to include a network name in the admission control response message based, at least in part, on whether the admission control message comprises a field having a value that indicates the network node is to send a predefined set of network attributes.

5. The network node of claim 1, wherein the at least one circuit is operable to include the network name in the admission control response message by, at least in part, operating to include in the admission control response message a network information element comprising:
   a header that identifies the network information element as being a network name type of network information element; and
   a payload comprising the network name.

6. The network node of claim 1, wherein the at least one circuit is operable to store, in a first control parameter, a name that the network node is to use for a network that the network node creates.

7. The network node of claim 6, wherein the at least one circuit is operable to determine to include a network name in the admission control response message based also, at least in part, on the first control parameter storing the name that the network node is to use for a network that the network node creates.

8. The network node of claim 1, wherein the at least one circuit is operable to:
   store, in a first control parameter, an indication of no name to use for a network that the network node creates; and
   determine to not include a network name in the admission control response message based also, at least in part, on the first control parameter storing the indication of no name to use for a network that the network node creates.

9. A network node, the node comprising:
at least one circuit in a MoCA (Multi-media over Coax Alliance) network comprising:
a network communication circuit; and
a processor and memory, wherein the at least one circuit is operable to, at least:
receive a first admission control message from a first node; and
in response to the first admission control message:
form a second admission control message by, at least in part, operating to:
determine, based at least in part on contents of the first admission control message, whether to include a network name in the second admission control message; and
if it is determined to include a network name in the second admission control message, then include the network name in the second admission control message comprising a network admission control parameter, wherein at least one value of the network admission control parameter indicates that a particular network node may join only a network having a particular name, and wherein the at least one value of the network admission control parameter is the particular name;
maintain a $\text{NETWORK\_NAME}_{REC}$ parameter to report that a particular node name was received;
maintain the particular node name as a $\text{NETWORK\_NAME}_{PAYLOAD}$ parameter; and
send the second admission control message to a third node that is different than the first node, wherein the second admission control message is an admission control response message.

10. The network node of claim 9, wherein the at least one circuit is operable to determine whether to include a network name in the second admission control message based, at least in part, on whether the first control message comprises a field having a value that indicates the network node is to send network attributes.

11. The network node of claim 9, wherein the at least one circuit is operable to determine whether to include the network name in the second admission control message based, at least in part, on whether the first admission control message comprises a field having a value that indicates the network node is to send a predefined set of network attributes.

12. The network node of claim 9, wherein the at least one circuit is operable to include the network name in the second admission control message by, at least in part, operating to include in the second admission control message an ASCII-encoded string representing the network name.

13. The network node of claim 9, wherein the at least one circuit is operable to include the network name in the second admission control message by, at least in part, operating to include in the second admission control message a network information element comprising:
a header that identifies the network information element as being a network name type of network information element; and
a payload comprising the network name.

14. The network node of claim 9, wherein the at least one circuit is operable to store, in a first control parameter, a name that the network node is to use for a network that the network node creates.

15. The network node of claim 14, wherein the at least one circuit is operable to determine to include the network name in the second admission control message based also, at least in part, on the first control parameter storing the name that the network node is to use for a network that the network node creates.

16. The network node of claim 9, wherein the at least one circuit is operable to store, in the first control parameter, an indication of no name to use for a network that the network node creates.

17. The network node of claim 16, wherein the at least one circuit is operable to determine to not include a network name in the second admission control message based also, at least in part, on the first control parameter storing the indication of no name to use for a network that the network node creates.

18. The network node of claim 14, wherein the first control parameter is user-configurable.

19. The network node of claim 9, wherein the first admission control message is a Discovery Request message, and the second admission control message is a Discovery Response message.

20. The network node of claim 9, wherein the network node is a network coordinator node of a premises-based cable network.

* * * * *